United States Patent [19]

Gosin

[11] 4,299,632

[45] Nov. 10, 1981

[54] CERAMIC MIXTURE

[76] Inventor: Naum Gosin, 55 W. 92 St., Apt. 5 "G", New York, N.Y. 10025

[21] Appl. No.: 189,368

[22] Filed: Sep. 22, 1980

[51] Int. Cl.³ .............................................. C04B 33/13
[52] U.S. Cl. ................................... 501/127; 501/141; 501/86
[58] Field of Search ...................... 106/67, 71, 45, 42; 75/3

[56] References Cited

U.S. PATENT DOCUMENTS

| | | | |
|---|---|---|---|
| 3,053,647 | 9/1962 | Larpenteur | 106/71 |
| 3,258,327 | 6/1966 | Smoot | 106/71 |
| 3,844,812 | 10/1974 | Fishwick | 106/67 |

FOREIGN PATENT DOCUMENTS 292924 1/1971 U.S.S.R. .
336297 4/1972 U.S.S.R. .

*Primary Examiner*—O. R. Vertiz
*Assistant Examiner*—Mark Bell
*Attorney, Agent, or Firm*—Ilya Zborovsky

[57] ABSTRACT

A ceramic mixture for production of ceramic articles includes, in % weight, clay 1–64, ore selected from the group consisting of iron ore and manganese ore 30–98, and at least one metal oxide 0.1 –12.

7 Claims, No Drawings

CERAMIC MIXTURE

BACKGROUND OF THE INVENTION

The present invention relates to ceramic mixture for manufacturing ceramic articles.

Oxide ceramics are known which are based on pure oxides with addition of organic binders and plasticizers. Articles produced from the oxide ceramics do not have metal-like appearance and are expensive.

Metal ceramics are also known which are powders of metal sintered in accordance with ceramic technology. Articles produced from metal ceramics do not have sufficient chemical resistance.

Common ceramics do not have metal-like appearance and structure and they do not accept polishing. Thereby angobe and glaze are utilized for improving the surface of articles.

Ferrites are manufactured from masses which contain iron oxide with addition of oxides of zinc, manganese, nickel, cobalt, magnesium with organic binders. Articles are sintered in reducing medium. They have a form of spinel, are magnetic, do not have metal-like structure, are very expensive and not sufficiently resistant in corrosive media.

A ceramic mass is known which includes iron ore and is utilized for manufacturing ceramic articles to be used in aggressive media. The known mass is desribed in USSR inventor's certificate No. 292924 and contains (in % weight):

clay binder—38–79,
fireclay binder—20–50, and
iron ore expressed as $Fe_2O_3$—1–12

Iron ore in the mass contributes to increase of thermal stability and density of the articles.

A mass is further known from the USSR inventor's certificate No. 336 297 which is utilized for producing chemically resistant articles and contains (in % weight):

clay binder—10–64
iron ore—36–90.

This mass (mixture) allows obtaining of highly dense stone-ceramic, porcelain-like and extraordinary dense articles with improved thermal conductivity. The above mentioned masses also possess some disadvantages.

SUMMARY OF THE INVENTION

Accordingly, it is an object of the present invention to provide a ceramic mixture which avoids the disadvantages of the prior art.

More particularly, it is an object of the present invention to provide a ceramic mixture which can be utilized for manufacture of articles having high hardness, metal-like structure, and accepting polishing.

In keeping with these objects and with others which will become apparent hereinafter, one feature of the present invention resides, briefly stated, in a ceramic mixture which includes (in % weight):

clay—1–64
ore selected from the group consisting of iron ore and manganese ore—30–98; and
at least one metal oxide—0.1–12.

The utilization of the above mentioned additions allows to improve properties of the articles manufactured from the inventive ceramic mixture, and more particularly to increase density and hardness, chemical resistance, refractoriness, to decrease friction coefficient, and to impart some specific properties to thereby widen the field of application In accordance with another advantageous feature of the present invention, the contents of clay is reduced to 10–1% weight. Such a mixture can be utilized for manufacture of articles having increased resistance to certain aggressive media, such as alkali, hydrofluoric, phosphoric etc, and also for manufacturing articles having metal-like structure of silver-black color.

In accordance with still another feature of the present invention, the iron ore is completely or partially replaced by manganese ore, preferably pyrolusite. Such a mixture provides for increase of linear expansion and reduction of roasting temperature, as well as for production of articles with metal-like structure of silver-black color.

A further feature of the present invention resides in that the metal oxide is black cobalt oxide $Co_3O_4$ or nickel $Ni_2O_3$, preferably within 0.1–6% weight. This increases hardness and provides for manufacture of article of diamond-black color.

Still a further feature of the present invention is that the metal oxide is chromium oxide $Cr_2O_3$, preferable within 2–3% weight. The articles produced from such ceramic mixture have metal-like structure of steel color.

An additional feature of the present invention is that the metal oxide may be manganese oxide $MnO_2$, preferably within 6–12% weight. This decreases roasting temperature and provides for production of articles of metal-like structure with black color.

For manufacturing articles of metal-like structure with low friction coefficient, working surfaces of articles may be subjected to short action of high temperatures within the range of 2700°–3000° F.

The novel features which are considered as characteristic for the present invention are set forth in particular in the appended claims. The invention itself, however, will be best understood from the following description of preferred embodiments.

DESCRIPTION OF PREFERRED EMBODIMENTS

A ceramic mixture in accordance with the present invention comprises (in % weight):

clay—1–64
ore selected from the group consisting of iron ore and manganese ore—30–98; and
at least one metal oxide—0.1–12.

The contents of clay may be reduced to 10–1%. The iron ore may be completely or particlly replaced by the manganese ore. Black cobalt oxide or nickel oxide may be utilized as the metal oxide. Chromium oxide may also be utilized. Finally, manganese oxide may be used in the inventive ceramic mixture.

The iron ore or concentrate contains, generally, iron compounds such as magnetite, martite, hematite, micaceous iron ore and the like. For obtaining structures with crystals oriented in accordance with the low of nature, ferrogineous combinations are used such as magnetite, martite, hydrogoethite or hydrohematite.

While its was mentioned that at least one metal oxide can be utilized, two or more metal oxides may be utilized together. Moreover, other oxides than those mentioned above may also be utilized.

Articles are produced from the inventive ceramic composition in the following manner:

Iron or manganese ore is comminuted to residue of 2–3% on a sieve of 365 mesh or finely dispersed concentrates are utilized. Mixing of components is performed by wet or dry methods. With the wet mixing method iron ore or manganese ore is mixed with metal oxides and clay in a container with a stirrer. The components may also be mixed in a mill. Dehydration of the suspension is performed in a filter-press and by a pulverizing drier.

With the dry mixing method, blending is carried out in a mixer during 5–7 minutes in a dry state, or during 7–10 minutes in a moist state.

Shaping of articles is performed by plastic molding from plastics with humidity of 18–26%, casting slip with humidity of 28–40%, and pressing from semi-dry masses with humidity of 4–6%.

For obtaining black stoneware articles with metal-like structure, the inventive ceramic mixture contains (% weight):
clay binder—52–64
iron ore—30–36
metal oxide—6–12

It is advantageous to use ball clay as the clay component of the mixture. The articles are produced from plastic and semi-dry masses, casting slip. The articles are formed, dried and fired at 2100°–2200° F. After firing the working surfaces can be polished or subjected to the action of high temperatures, preferably to 2700°–3000° F.

For obtaining black porcelain-like articles with metal-like structure, the inventive mixture contains (% weight):
clay binder—40–52
iron ore—44–54
metal oxide—4–6.

Kaolinite is preferable as the clay binder. The articles are produced from plastic and semi-dry masses, casting slip. The articles are formed, dried and fired at 2200°–2300° F. After firing, the articles can be polished or subjected to short action of high temperatures, preferably to 2700°–3000° F.

For obtaining black super dense articles with extremely high thermal conductivity and with metal-like structure, the invention mixture contains (% weight):
clay binder—10–40
iron ore—57–86
metal oxide—3–4.

Kaolinite is preferable as the clay component. The articles are produced from plastic and semi-dry masses, casting slip. The articles are formed, dried and fired at 2300°–2400° F. After firing, the articles can be polished or subjected to short action of high temperatures, preferably to 2700°–3000° F.

For obtaining black hematite-like articles with metal-like structure, the inventive micture contains (% weight):
clay binder—1–10
iron ore—89–96 or
manganese ore—89–96 Metal oxides may be added, if necessary (preferably 0.1–2). Kaolinite is preferable as the clay component. The articles are produced from plastic and semi-dry masses, casting slip. The articles are formed, dried and fired at 2300°–2500° F. After firing, polishing of the working surfaces of the articles or subjecting the same to the action of high temperatures are possible.

For obtaining black antifriction material with metal-like structure, the mixtures are utilized which are mentioned hereinabove, in dependence upon the condition of their utilization. The articles are produced from plastic and semidry masses, casting slip. The articles are formed, dried and fired at 2100°–2500° F. After firing, the surfaces to be subjected to friction in operation are polished or treated by high temperatures to 2700°–3000° F.

It is also possible to use the metal oxides only in separate layers of the articles. In this case, ore-containing masses are utilized as main mass, whereas the metal oxides are introduced into the mass serving for the working surfaces.

Depending upon the contents of the ceramic mixture, the articles produced therefrom have the density between 2 and 5 g/cm$^3$, hardness between 4.5 and 7 Mohs, acid and alkali resistance to 99%.

It is also possible to use the ceramic mixture which includes iron or manganese ore between 90 and 99% weight, and clay between 10 and 1%, without the metal oxides.

The new materials produced from the inventive ceramic mixture can be utilized to protect structural constructions from corrosion, for cladding underground and submarine structures, and for facing technological apparatuses in chemical, oil, gas, metallurgical, paper industries. The refractory materials can be used in condition of up to 2000° F. They also can be used for different kinds of chemical stoneware such as brick, shapes, utensils, laboratory equipment, kiln furniture etc. These materials are advantageous in that they are inexpensive, simple to manufacture, allow implementation of intensive technological processes, and provide for equipment and structural constructions having long service life. The materials may be utilized as laboratory hot ware for alkaline, hydrofluoric, phosphoric, etc. materials They also may be used as corrosion resistant materials for machine parts (bearings, bushings etc) which operate with sliding friction and must have low coefficient of friction. They are notable for low adhesion, good wearin, thermal conductivity and stable characteristics. Finally, they can be utilized for jewelry, sculpture, hot dinneware, for example as black material and hematite like articles. They also may be utilized as corrosion-resistant material for storing wastes of nuclear materials, for storage batteries etc.

The invention is not limited to the details shown since various modifications and structural changes are possible without departing from the spirit of the present invention.

What is desired to be protected by Letters Patents is set forth in the claims.

1. A ceramic mixture, consisting of (in % weight):
clay—1–64;
ore selected from the group consisting of iron ore and manganese ore—30–98; and
at least one metal oxide selected from the group consisting of black cobalt oxide, nickel oxide, chromium oxide and manganese oxide 0.1–12.

2. A ceramic mixture as defined in claim 1, wherein the mixture includes both iron ore and manganese ore.

3. A ceramic mixture as defined in claim 1, wherein said black cobalt oxide is contained within 0.1–6.

4. A ceramic mixture as defined in claim 1, wherein said chromium oxide is contained within 2–3.

5. A ceramic mixture as defined in claim 1, wherein said manganese oxide is taken within 6–12.

6. A ceramic mixture as defined in claim 1 containing at least two metal oxides.

7. A ceramic mixture as defined in claim 1, wherein said clay is contained within 1–10.

* * * * *